April 7, 1953 | C. H. DIXON | 2,633,961

MECHANICAL COIN CONTROLLED DEVICE

Filed April 29, 1948 | 12 Sheets-Sheet 1

INVENTOR
Charles H. Dixon
Carlson, Pitzner, Hubbard & Wolfe
ATTORNEYS

April 7, 1953 C. H. DIXON 2,633,961

MECHANICAL COIN CONTROLLED DEVICE

Filed April 29, 1948 12 Sheets-Sheet 2

Inventor
Charles H. Dixon
Carlson, Pitzner, Hubbard & Wolfe
Attorneys

INVENTOR
Charles H. Dixon
Carlson, Pitzner, Hubbard + Wolfe
ATTORNEYS

MECHANICAL COIN CONTROLLED DEVICE

Filed April 29, 1948 12 Sheets-Sheet 4

INVENTOR
Charles H. Dixon
Carlson, Pitzner, Hubbard + Wolfe
ATTORNEY

Inventor
Charles H. Dixon
Carlson, Pitzner, Hubbard + Wolfe
Attorney

INVENTOR
Charles H. Dixon
Carlson, Pitzner, Hubbard & Wolfe
ATTORNEY

April 7, 1953 C. H. DIXON 2,633,961

MECHANICAL COIN CONTROLLED DEVICE

Filed April 29, 1948 12 Sheets-Sheet 7

INVENTOR
Charles H. Dixon
Carlson, Pitzner, Hubbard & Wolfe
ATTORNEYS

April 7, 1953 C. H. DIXON 2,633,961

MECHANICAL COIN CONTROLLED DEVICE

Filed April 29, 1948 12 Sheets-Sheet 8

INVENTOR
Charles H. Dixon
Carlson, Pitzner, Hubbard & Wolfe
ATTORNEYS

INVENTOR
Charles H. Dixon
Carlson, Pitzner, Hubbard & Wolfe
ATTORNEYS

INVENTOR
Charles H. Dixon
Carlson, Pitzner, Hubbard & Wolfe
ATTORNEYS

April 7, 1953 C. H. DIXON 2,633,961

MECHANICAL COIN CONTROLLED DEVICE

Filed April 29, 1948 12 Sheets-Sheet 11

INVENTOR
Charles H. Dixon
Carlson, Pitzner, Hubbard & Wolfe
ATTORNEYS

MECHANICAL COIN CONTROLLED DEVICE

Filed April 29, 1948 12 Sheets-Sheet 12

INVENTOR
Charles H. Dixon
Carlson, Pitzner, Hubbard & Wolfe
ATTORNEYS

UNITED STATES PATENT OFFICE 2,633,961

MECHANICAL COIN-CONTROLLED DEVICE

Charles H. Dixon, Detroit, Mich., assignor to Ex-Cell-O Corporation, Detroit, Mich., a corporation of Michigan Application April 29, 1948, Serial No. 23,942

13 Claims. (Cl. 194—92)

The present invention relates generally to coin operated mechanisms and more specifically to a multiple coin controlled lock having particular but by no means exclusive utility for governing the delivery of purchased articles from a vending machine.

One of the objects of the invention is to provide a multiple coin controlled lock capable of being released in response to the depositing, in any sequence, of various coins aggregating a predetermined total value. This comprehends responsiveness to the deposit of any possible combination of coins aggregating the predetermined total value and selected from the denominational series included within such total value.

Another object is to provide a multiple coin controlled lock of the character set forth and which can be selectively adjusted for response to various predetermined total values of coinage.

A further object is to provide a coin controlled mechanism of the above type wherein coins deposited in excess of the predetermined total value for which the mechanism has been set will be promptly and automatically returned to the customer.

Still another object is to provide a coin controlled mechanism of the character set forth wherein coinage totaling to the predetermined value or to a lesser value may be returned at the option of the depositor at any time before he starts to claim his purchase. A related object is to provide a mechanism which will preclude the return of coinage having the predetermined total value once the customer has taken steps to claim his purchase.

Another object is to provide a mechanism of the above type wherein coins having an aggregate value below that for which the mechanism has been set, and which have been deposited prior to the deposit of a defective or spurious coin, will be returnable together with the defective coin.

Other objects and advantages will become apparent as the following detailed description proceeds, taken in connection with the accompanying drawings, wherein:

Fig. 8 is another view similar to that of Fig. 7 but taken through the accumulator for coins of the highest denomination and in the plane of the line 9—9 in Fig. 5, the latch bar and certain other movable parts also being indicated.

Figures 14, 15:
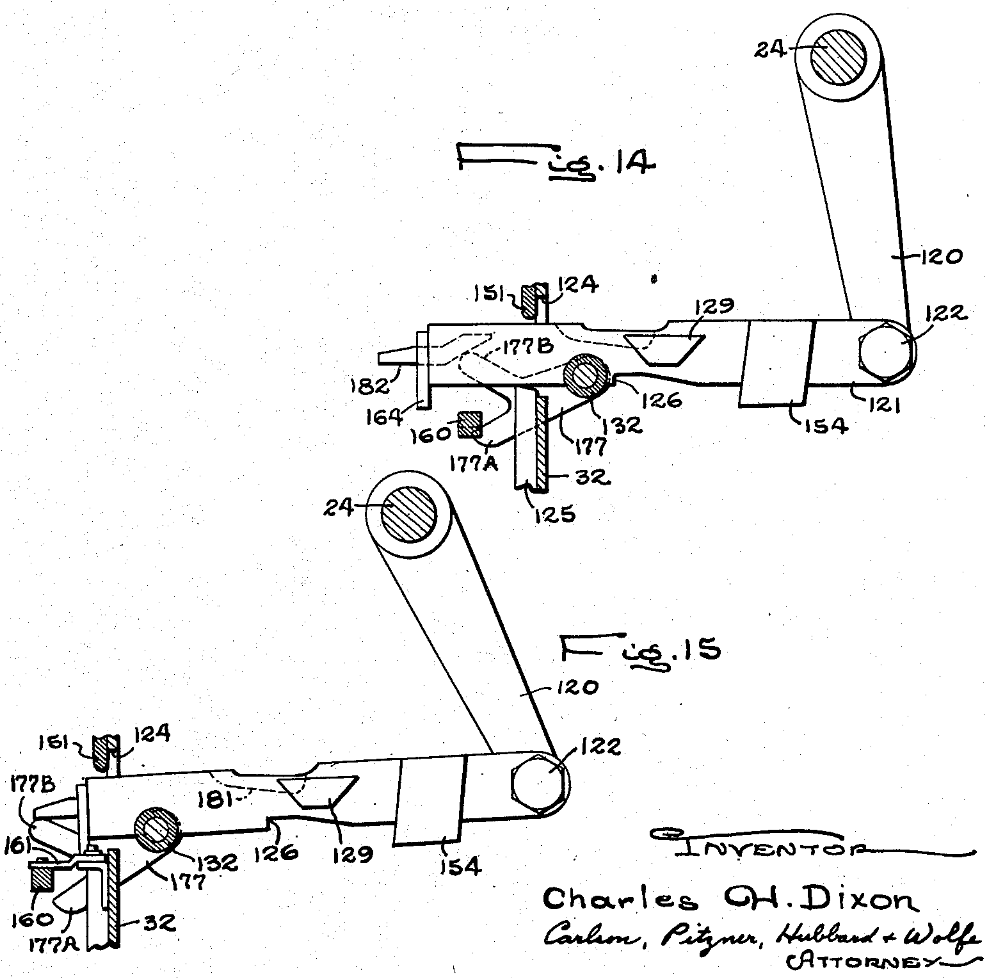
Figures 16, 17:
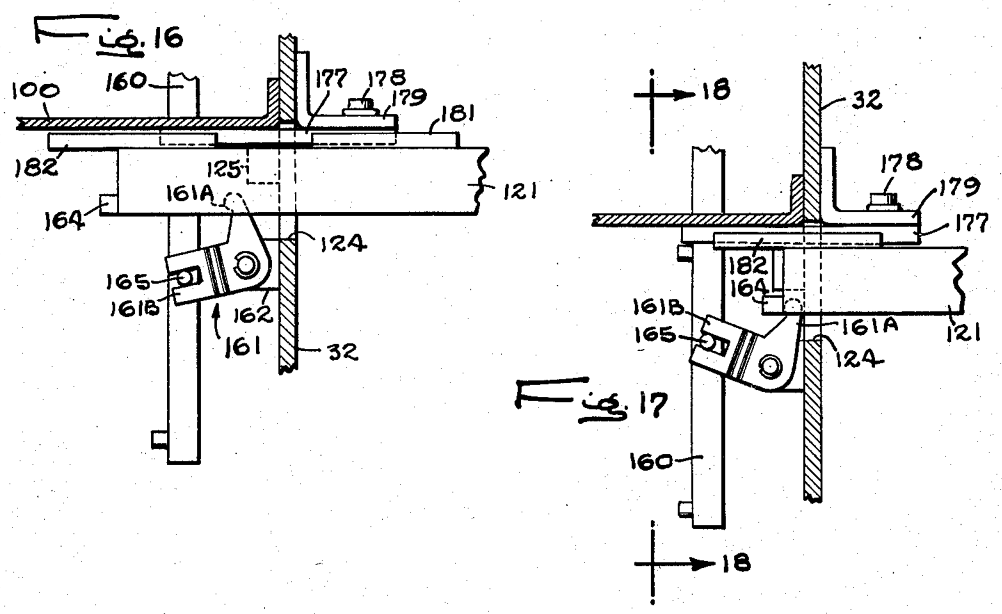

Figs. 16 and 17 are enlarged fragmentary plan views taken respectively in the planes of the lines 16—16 and 17—17 in Figs. 14 and 15.

Figure 18:
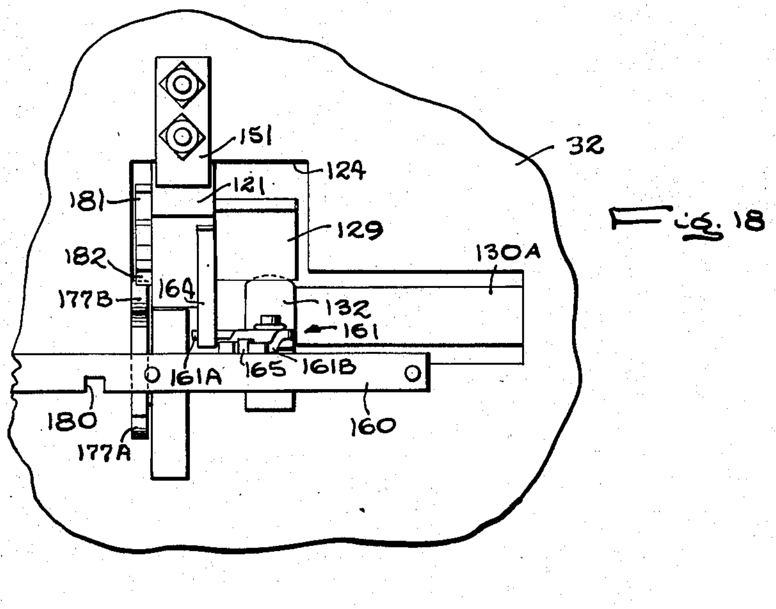

Fig. 18 is an enlarged vertical sectional view taken along the line 18—18 of Fig. 17 with the latch bar in its fully extended position.

Figure 4:
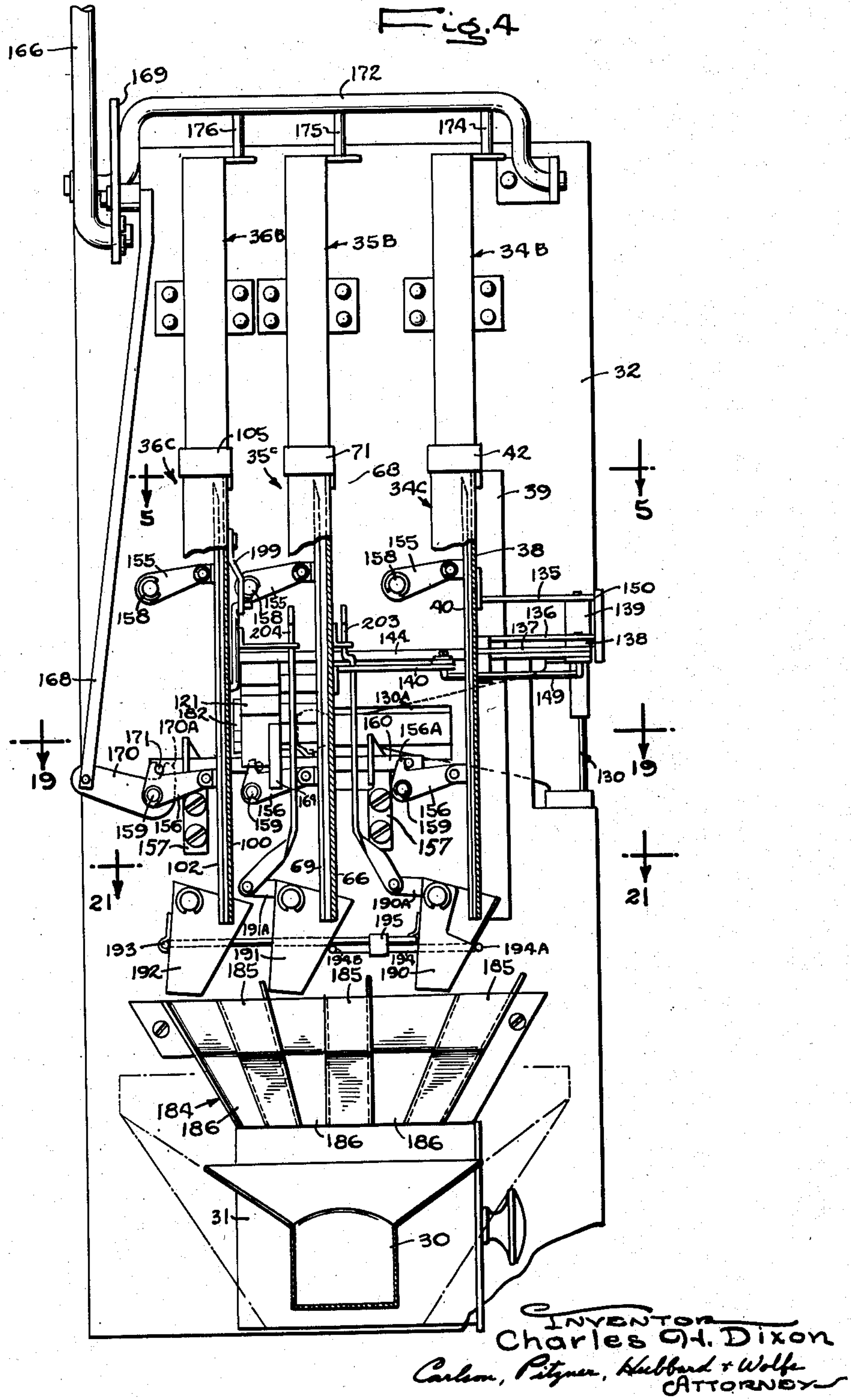
Fig. 4 is a fragmentary front elevational view, to a slightly larger scale, of the coin controlled mechanism illustrated in Fig. 3, the coin accumulating means and various parts associated therewith being shown in section.
Figures 19, 20:
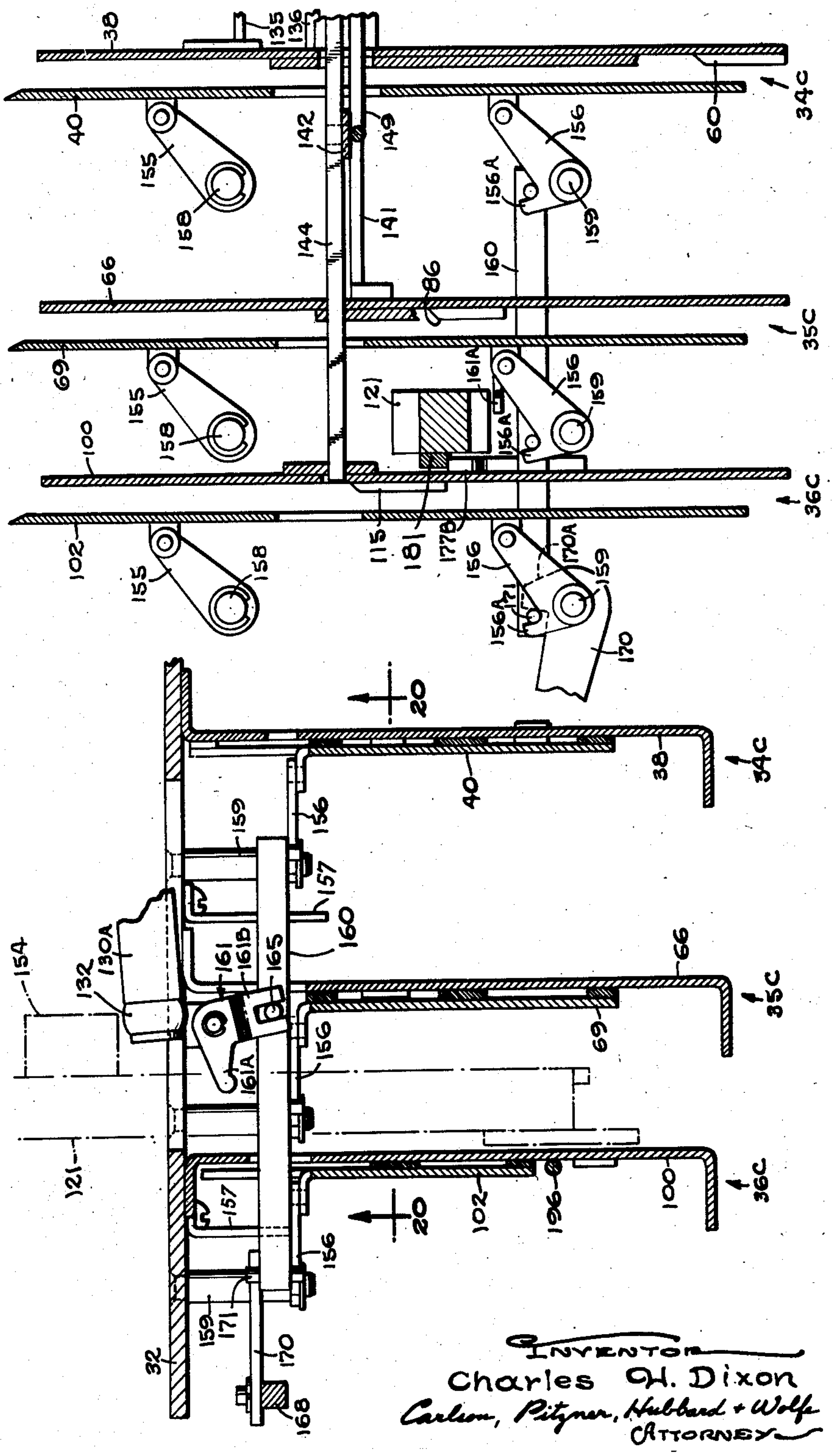

Fig. 19 is an enlarged fragmentary horizontal sectional view taken along the line 19—19 of Fig. 4 and showing in plan a portion of the accumulator dumping arrangement.

Fig. 20 is an enlarged fragmentary vertical sectional view taken along the line 20—20 of Fig. 19 with the coin accumulators in a dumping position.

Figures 21, 22, 23:
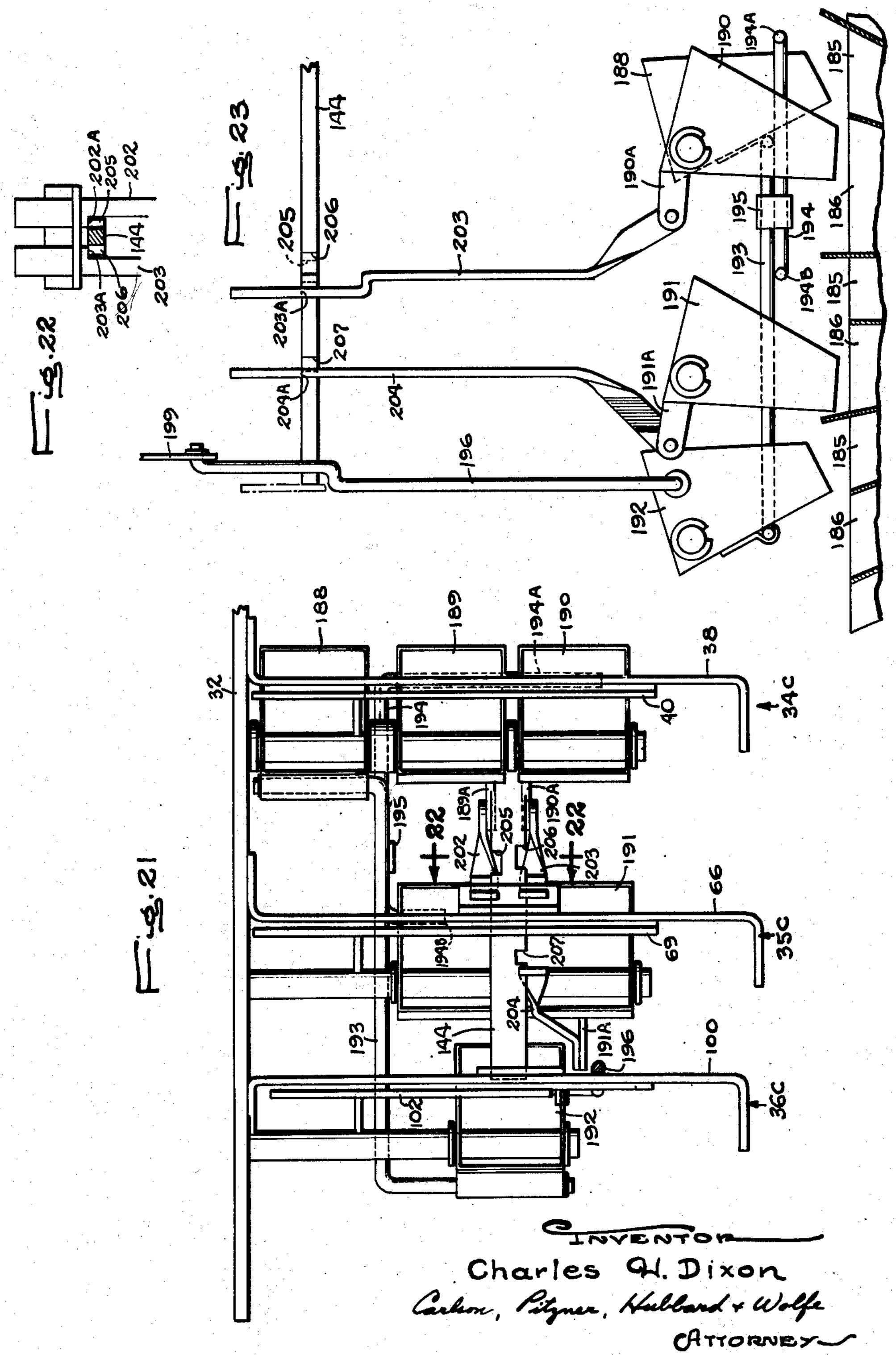

Fig. 21 is an enlarged fragmentary horizontal sectional view taken along the line 21—21 of Fig. 4 and showing in plan the relationship between the coin directing funnels and the master detector plunger.

Fig. 22 is a fragmentary vertical sectional view taken along the line 22—22 of Fig. 21.

Fig. 23 is an enlarged fragmentary elevational view of the coin directing funnels illustrated in Fig. 4, together with a portion of their actuating linkage.

Although a preferred embodiment of the invention has been shown and described in some detail there is no intention to thereby limit the invention to such embodiment, but on the other hand, the intention is to cover all modifications and alternative constructions falling within the spirit and scope of the invention as expressed in the appended claims.

Referring more specifically to the drawings, the invention has been there exemplified in the form of a multiple coin controlled lock mechanism 20 for a vending machine 21. In the present instance, the illustrative vending machine 21 happens to be of the type covered by my prior Patent No. 2,425,870, issued on August 19, 1947. Briefly, such a machine generally comprises a cabinet having a number of inclined chutes for storing articles of merchandise such as milk cartons and loading the same by gravity into a number of liftable delivery receptacles associated with the chutes. For regulating the upward movement of the delivery receptacles, the latter are equipped with individual guide rods 22 unitary therewith. The receptacles are normally retained in a locked position, such being accomplished by a cam shaft 24 having a series of axially spaced locking cams 25 adapted to engage respective locking grooves 26 in the guide rods 22. If the shaft 24 be left free to rotate through a sufficient angle for the cams 25 to swing clear of the locking grooves 26, any selected delivery receptacle may be elevated for the removal of a purchase article. If, on the other hand, the shaft 24 should be locked or only permitted to rotate through an exceedingly small angle, it will of course be impossible to elevate any one of the delivery receptacles to the extent necessary for removal of an article of merchandise therefrom. The lifting of more than one delivery receptacle at a time is effectively precluded through the use of a ball interlock arrangement 28 associated with the rods 22, the details of the former being unimportant for present purposes.

Provision is made within the lock mechanism 20 for accumulating deposited coins until a predetermined total value representing the purchase price has been reached, any coins deposited in excess of such total value being returnable via an excess return chute 29 or other directing means and a coin return box 30, such box being accessible from the exterior of the machine 21. The accumulation within the lock 20 of coinage equal to the purchase price conditions the lock so as to permit rotation of the cam shaft 24 through a relatively large angle. Consequently, upon elevation of any selected delivery receptacle the cam 25 disengages readily from the groove 26 in the guide rod 22. As an incident to the elevation of such selected receptacle for delivery of a purchased article, the return of the purchase money is precluded and the coins which constitute it are dumped into a cash box 31 via suitable directing means. When the elevated delivery receptacle has been returned to its initial or lowermost position, the mechanism 20 becomes automatically reset for the next operating cycle.

*General organization*

Turning again to Figs. 1 to 3 inclusive, it will be noted that the lock mechanism 20 is assembled upon a mounting plate 32 adapted to be housed in a substantially upright position within the cabinet of the vending machine 21. Located adjacent the lower edge portion of the sloping top wall of the cabinet and in vertical alinement with the mechanism 20 is a plate fitting having a series of coin slots 34, 35 and 36 which, in the present instance, are dimensioned to receive pennies, nickels and dimes, respectively. Rigidly supported in a suitable bracket below the coin slots 34, 35, 36 and adapted to register with respective ones of the same are a corresponding number of coin entry chutes 34A, 35A and 36A.

Closely associated with the lower ends of the entry chutes and arranged to receive coins from the same are a number of coin selectors 34B, 35B and 36B, which register with each respective entry chute. The latter merely serves to detect and retain defective or spurious coins, such as magnetic slugs, eventually releasing and diverting them to the chute 29 and thence to the coin return box 30. The coin selectors may be of any well known construction, their details forming no part of the present invention.

Mounted on the plate 32 below the coin selectors and arranged to receive coins from respective ones of the latter are a plurality of coin accumulators 34C, 35C and 36C. The first acccumulator, namely 34C, comprises a multiple chute assembly for holding coins of the lowest denomination in the series of coinage usable in the mechanism 20, such denomination in the present case constituting pennies. The accumulator 35C also comprises a multiple chute arrangement and is designed for coins of the next highest denomination which, in the present instance, are nickels. The last accumulator 36C is suitably dimensioned to receive coins of the highest denomination accepted by the mechanism 20 and which, in the present instance, constitutes dimes.

For the purpose of conditioning the lock mechanism 20 to permit the release of the locking cams 25 and also to permit the transfer of coinage from the accumulators to the cash box 31, a novel coin detecting and counting system is utilized, together with an appropriate coin directing arrangement. Such system is, of course, responsive to the various combinations and sequences of coins deposited within the mechanism 20. Also associated with the latter is a manual coin return arrangement operable in response to the depression of a coin return plunger 38 mounted on the sloping upper wall of the vending machine cabinet adjacent the coin slots 34, 35 and 36.

*Coin accumulating means*

The coin accumulating means, detailed in Figs. 4, 5, 7, 8 and 9 comprises the three coin accumulators 34C, 35C and 36C, mentioned above. All three of the accumulators are of generally similar construction, differing principally in the matter of coin storage capacity which is determined in each case by the particular denomination to be received therein.

Starting with the penny accumulator 34C (Fig. 7), it will be noted that the latter comprises a generally rectangular backing plate 38 rigidly attached to the main mounting plate 32 of the mechanism by means of an edge portion 39 perpendicular to the general plane of the backing plate. Arranged in closely spaced parallel relationship with the backing plate 38 is a movable retainer plate 40 which serves to releasably confine coins within the accumulator 34C. For the purpose of maintaining the latter in registration with the overlying coin selector 34B, a rectangular locating lug 41 is fixed to one side of the plate 38 in the vicinity of the upper edge portion thereof. An additional lug 42 is also provided for the same purpose and, if desired, these two lugs may be fashioned from a unitary band.

The space enclosed between the plates 38 and 40 is subdivided into a main chute 44, a plurality of storage chutes 45, 46, 47 and a return chute 48. This subdivision is accomplished by the use of a number of partition strips 49, 50, 51, 52 and 53 rigidly attached to the backing plate 38. Also fixed to the plate 38 and for the purpose of facilitating the entry of coins into the storage chutes 46, 47 are a pair of coin deflector buttons 54 and 55 having relatively small diameters. Rigidly attached to the upper right hand portion of the plate 38 is a downwardly inclined deflector vane 56 which, together with the flanged edge 58 of the backing plate, defines a bad coin chute 59. The purpose of the latter is, of course, to receive defective or spurious coins from the coin selector 34B and to channel them into the coin return chute 48.

In the present instance, the individual accumulating capacity of the chute 45 is adjustable, while that of the chutes 46 and 47 remains fixed at 5 pennies each due to the presence of a fixed abutment 60 near the bottom of the chute 46 and a similar abutment 61 at the bottom of the chute 47. In the case of the chute 45 which will be referred to as the "odd penny" chute, its storage capacity can be varied between one and 5 pennies, depending upon the position of a vertically adjustable abutment 62 which rides in a slot 64 in the backing plate 38. The abutment 62 can be maintained in a given position by the use of an appropriate dowel or screw 65, the plate 38 having a series of suitably spaced holes for receiving such a member and corresponding to the various positions of the abutment 62. In the embodiment of the device illustrated in Fig. 7, the capacity of the chute 45 has been set for four pennies.

With the foregoing arrangement, the first four pennies accepted by the coin selector 34B will enter the accumulator 34C via the main chute 44 and will then successively drop into the odd penny chute 45, filling the same. The fifth penny will also enter through the chute 44 and, upon striking the top coin in the chute 45, will spill over into the adjacent chute 46. This This process will continue until the chute 46 has likewise accumulated its total capacity of five pennies, whereupon additional coins will take a second spill and drop into the chute 47. Once the latter is filled up with five coins, any additional coins entering the coin accumulator via the chute 44 will automatically spill into the return chute 48 which will permit them to drop into the coin return box 30.

The nickel accumulator 35C (Fig. 8) is patterned generally after the penny accumulator but is equipped with different internal partitioning and coin return channeling. Thus the accumulator 35C comprises a stationary backing plate 66 attached to the mounting plate 32 by means of a marginal flanged portion 68 and disposed in spaced apart parallel relationship with the penny accumulator 34C. A movable retainer plate 69 is mounted in close proximity to the plate 66 so as to define between itself and the latter a suitable coin receiving space. As in the case of the penny accumulator, the accumulator 35C is maintained in registration with its overlying coin selector 35B by the use of lugs 70, 71 similar to the lugs 41, 42.

Rigidly attached to the backing plate 66 are a plurality of partition strips 72, 74, 75, 76 and 78 which define a main chute 79, a first branch chute 80, a second branch chute 81, and a return chute 82. As the drawing indicates, the total coin storage capacity of each of the branch chutes is one nickel. In order to facilitate the entry of coins into the second branch chute 81, a small diameter deflector button 84 is mounted on the plate 66 so as to overlie such chute. Coins are precluded from dropping completely through the chutes 80 and 81 by means of a pair of fixed abutments 85, 86 associated with respective ones of the latter, the abutment 86 being mounted substantially lower than the abutment 85.

With the arrangement described, a nickel entering the main chute 79 from the coin selector 35B will roll into the first chute 80 and fill the same. A second nickel entering via the main chute will then strike the first one and spill over into the second chute 81. Since any coins subsequently entering the main chute 79 will now roll to the left, suitable provision is made for catching such coins and directing them into the return chute 82. Thus, the plate 66 is formed with an angular opening 88 adjacent the second nickel chute 81 and another opening 89 in the wall of the return chute 82. Rigidly attached to the rear side of the backing plate 66 and disposed with its respective ends in registration with the openings 88 and 89 is a downwardly inclined cross return chute 90. The upper end of the chute 90 is fashioned with a deflector wall 91 which extends into the coin receiving space between the plates 66 and 69 for the purpose of catching additional coins spilling over from the chute 81 and deflecting such coins into the cross return chute 90. The lower end of the latter has a depending projection 92 which gradually slopes from the outer wall of the cross return chute downwardly toward the plane of the backing plate 66.

On the upper right hand portion of the plate 66 there is mounted a downwardly inclined deflector vane 94 similar to the vane 56 of the penny accumulator. The vane 94, together with an out-turned edge portion 95 of the plate 66 defines a bad coin chute 96 which directs rejected coins from the selector 35B to the return chute 82. To make certain that such coins will fall freely past the edges of the opening 89, the latter may be formed with a pair of spaced apart slot extensions 98 defining a deflector lug 99 unitary with the plate 66. The lug 99 may be inclined downwardly and toward the movable plate 69 so as to make a small angle with the plate 66.

The dime accumulator 36C (Fig. 9), like the accumulators 34C and 35C, comprises a backing plate 100 mounted in spaced apart parallel relationship with the other accumulators and secured to the plate 32 by means of a marginal attaching flange 101. Operatively associated with the backing plate is a movable coin retainer plate 102 which defines between itself and the plate 100 a suitable coin receiving space. The accumulator 36C, like the other accumulators, is maintained in registration with the selector 36B by means of lugs 104 and 105 similar to the lugs 41, 42.

The coin receiving space within the accumulator 36C is divided into a main chute 106, a branch chute 108 and a return chute 109 by means of partition strips 110, 111, 112, and 114 all of which are rigidly fixed to the backing plate 100. The total accumulating capacity of the branch chute 108 is fixed at one dime due to the location therein of a fixed abutment 115. As the drawing indicates, the first dime to enter the main chute 106 will drop freely into the branch chute 108, while successive dimes will merely impinge upon the first dime, spilling over the partition 114 and into the return chute 109. For channeling rejected coins into the return chute, the accumulator 36C is provided with a downwardly inclined deflector vane 116 which, together with a border flange 118 unitary with the plate 100, defines a bad coin chute 119 overlying the return chute 109.

*Coin detecting and counting system*

Figures 10, 11, 12:
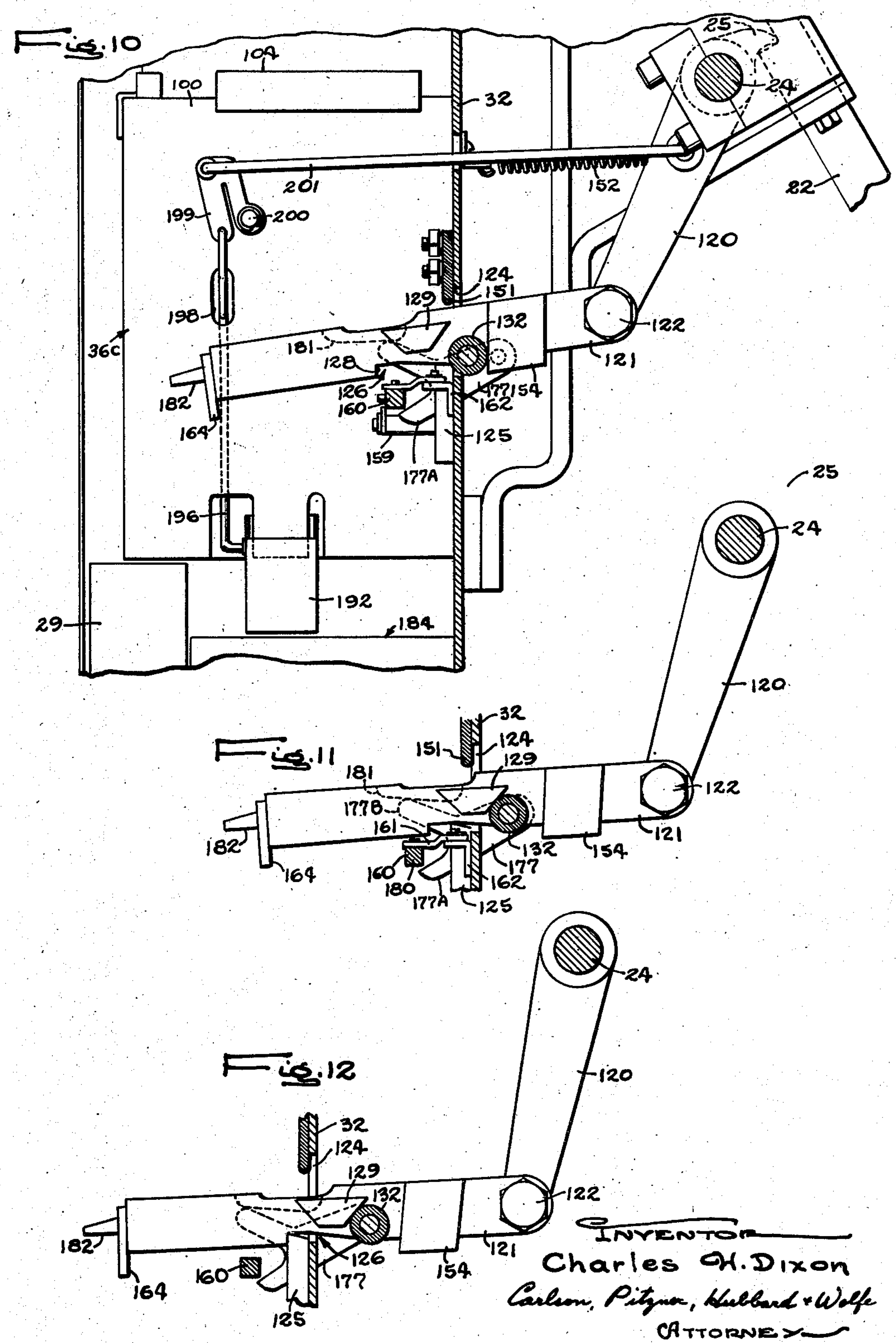
Fig. 10 is a fragmentary vertical sectional view taken along the line 10—10 of Fig. 5 and showing the latch bar in its initial position prior to the start of an operating cycle.
Fig. 11 is a fragmentary view of a portion of the linkage shown in Fig. 10, such linkage having been moved through a short distance toward its releasing position.
Fig. 12 is a fragmentary view similar to Fig. 11 but showing the latching action of the linkage when no coinage, or an inadequate amount, has been deposited.

As a preliminary to a discussion of this system it might be well to point out that various combinations of coins will be deposited in various sequences and collected within the accumulators 34C, 35C and 36C. The overall purpose of the foregoing system is to discriminate between coin combinations aggregating the predetermined value for which the mechanism 20 has been conditioned to respond and those combinations aggregating some lesser value. As an incident to the exercise of such discrimination, the detecting and counting system is arranged to free the cam shaft 24 for rotation through an angle sufficient to permit the disengagement of one of the locking cams 25 from its associated groove 26 upon elevation of a selected one of the delivery receptacles D. This is accomplished in the present instance by the use of a rocker arm 120 (Figs. 3 and 10), keyed or otherwise rigidly secured to the shaft 24, and a latch bar 121 pivotally attached as at 122 to the depending end of the arm 120. The latch bar 121 is so arranged that it can be longitudinally extended or retracted with respect to the mechanism 20 through a relatively large opening 124 in the mounting plate 32. Normally the bar 121 rests upon the upper edge surface of a stationary latch plate 125 rigidly attached to the plate 32 by any suitable means. Approximately midway between the ends of the bar 121 the flat under surface of the same is formed with a relatively long transverse notch 126 terminating rather abruptly in a generally upright abutment or shoulder 128 (Figs. 10 to 15). The latter is adapted to engage the stationary plate 125 as indicated in Fig. 12 and thereby to preclude extension of the bar 121 from the mechanism 20 through more than a negligible distance which is insufficient to release any of the delivery receptacles D.

Provision is made for lifting the latch bar 121 vertically through the necessary distance to permit the abutment 128 to clear the stationary plate 125 upon the depositing of any combination of coins having the predetermined value for which the mechanism 20 has been set. With the deposit of such coinage it becomes possible to elevate any selected delivery receptacle D, the cam 25 and the rocker arm 120 merely swinging through the necessary angle to release the guide rod 22, the bar 121 at the same time being drawn longitudinally without restraint to its fully extended position. In the exemplary mechanism 20, this is achieved by the use of a laterally projecting cam abutment 129 unitary with the bar 121 together with a coin responsive detector bell crank 130 having at the end of one arm 130A a roller 132 adapted to coact with the cam 129. The detector bell crank 130 is pivotally mounted as at 131 for limited oscillation in a generally horizontal plane and is normally oriented with its roller 132 occupying the position indicated in Figs. 5, 10 and 19.

Figures 5, 5A, 6:
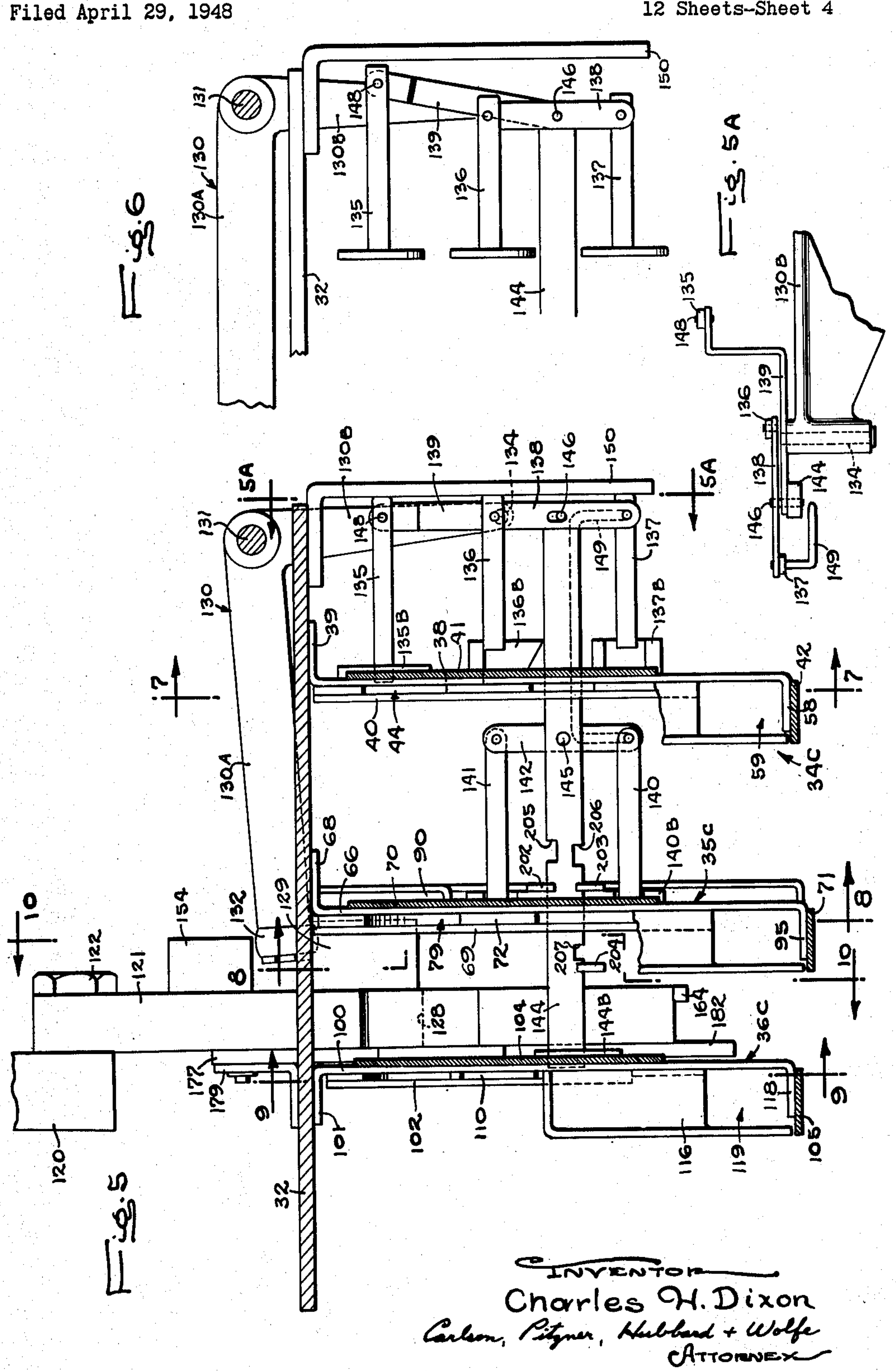
Fig. 5 is an enlarged horizontal sectional view taken on the line 5—5 of Fig. 4 showing the coin accumulators in plan and detailing the arrangement of the detector plungers, the dumping mechanism having been omitted.
Fig. 5A is a fragmentary view taken along the line 5A—5A of Fig. 5 and showing certain of the detector plungers in end elevation.
Fig. 6 is a fragmentary view also taken on the line 5—5 of Fig. 4 but showing certain of the detector plungers in an advanced position, the total predetermined value of coinage having previously been deposited in one of the coin accumulators.

For the purpose of making the bell crank 130 coin responsive, its other arm 130B is pivotally connected as at 134 to a linkage of detector plungers operatively associated with the coin accumulators 34C, 35C and 36C. Referring more particularly to Figs. 3 to 9, it will be observed that such linkage comprises a series of individual plungers pivotally interconnected and mounted for limited reciprocation in a direction substantially perpendicular to the general planes of the coin accumulators. The number of plungers associated with a particular accumulator corresponds exactly to the number of coin storage chutes therein. Thus in Fig. 5 there is shown a series of penny detector plungers 135, 136 and 137 adapted to be moved transversely across the respective coin chutes 45, 46 and 47 through suitably alined slots 135A, 136A and 137A in the plates 38 and 40 of the penny accumulator. Registration of the plunger ends with these slots is facilitated by the use of suitably channelled stationary guide blocks 135B, 136B and 137B secured to the outer side of the backing plate 38. The plungers 136 and 137 are pivotally connected adjacent their ends by means of a cross lever 138 (Figs. 5, 5A and 6). By the same token, the plunger 135 is pivotally connected to the cross lever 138 at an intermediate point on the latter by means of a cross lever 139 having a vertical offset portion to allow for the vertical distance between the plunger 135 and the lever 138. The pivotal connection 134 between the arm 130B of the detector bell crank and the entire detector plunger linkage is located on the cross lever 139 at a point intermediate its ends.

Operatively associated with the nickel accumulator 35C and transversely movable across the respective coin chutes 80 and 81 are a pair of nickel detector plungers 140 and 141 similar in character to the plungers 136 and 137. Suitable slots 140A and 141A (Fig. 8) are provided in the plates 66 and 69 to permit the entry of the plungers 140 and 141 into the coin chutes, such entry being facilitated by a guide block 140B mounted on the outer side of the backing plate 66. The plungers 140 and 141 are pivotally connected together by means of a cross lever 142 (Fig. 5) resembling the lever 138.

Figure 9:
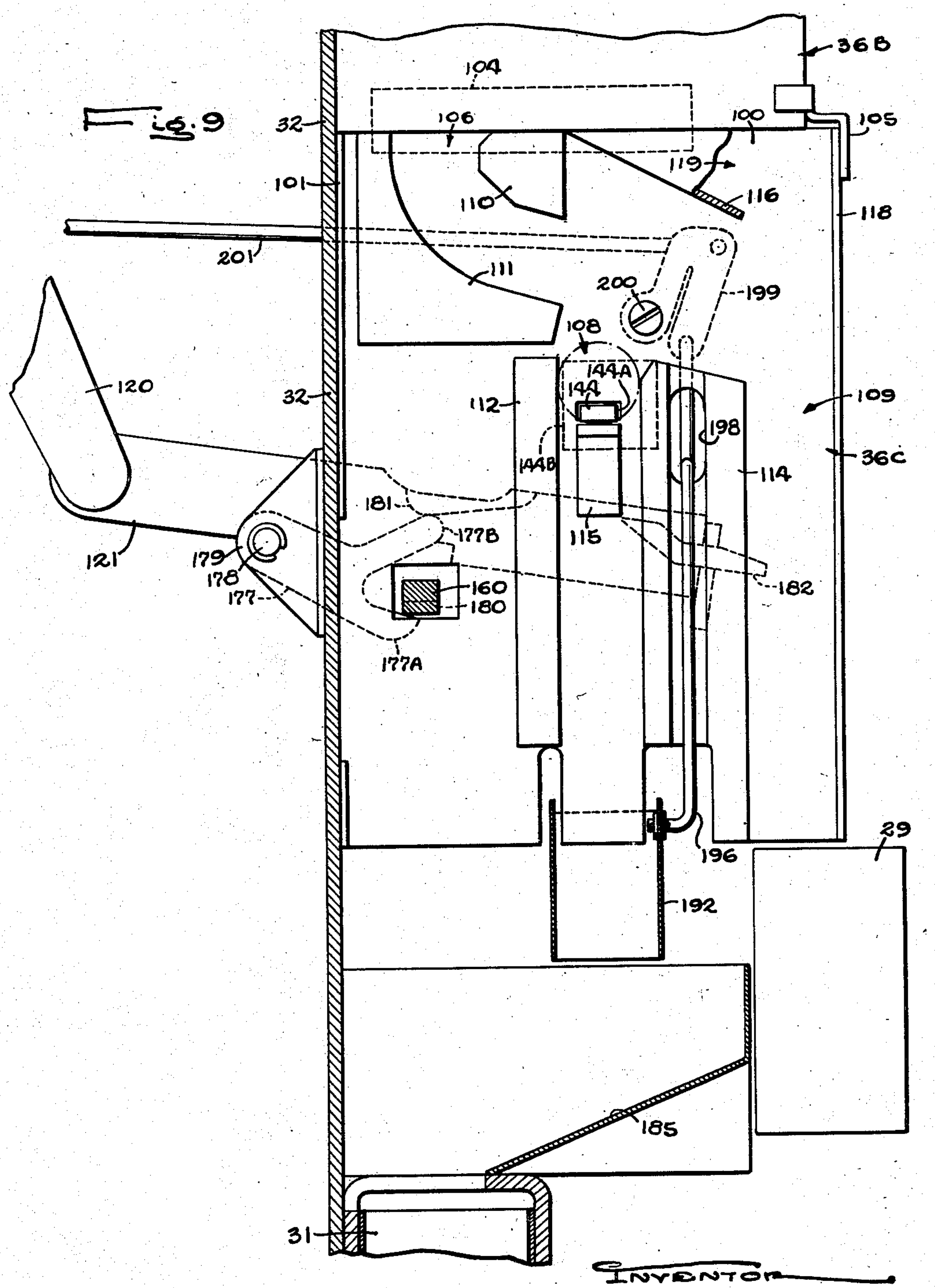

In Figs. 5 and 9 there is shown a relatively long detector plunger 144 which extends through all the coin accumulators. The end portion of the plunger 144 is adapted to move in slots 144A in the side plates 100, 102 of the dime accumulator 36C and thus to enter transversely the coin chute 108. As in the case of the plungers already described, the plunger 144 is guided into the above slots by means of a stationary guide block 144B attached to the outer side of the backing plate 100. The dime detector plunger also serves as a connecting link between the cross levers 138 and 142 of the penny and nickel detector plungers, the cross levers being pivoted intermediate their ends as at 145 and 146 so as to fulcrum on the plunger 144. In order to minimize the number of detector plungers, the ends of the cross levers 138 and 142 adjacent the plungers 137 and 140 are swivelly connected by means of a bail 149 which causes the levers 138 and 142 to pivot in unison on the plunger 144. The pivot 146 also connects the plunger 144 to the left hand end of the cross lever 139 (Fig. 5A), the opposite end of the lever 139 being pivoted to the plunger 135 as at 148.

When the mechanism 20 is in a locked condition as illustrated in Figs. 5 and 10, the latch bar 121 will be in its fully retracted position and the detector bell crank 130 will lie in its extreme counterclockwise position with the right-hand ends of the penny detector plungers abutting against a mechanical stop 150. Should an attempt be made to elevate one of the delivery receptacles D without previously depositing any coinage, the rocker arm 120 will start to rotate and drag with it the latch bar 121, bringing the latter's cam 129 into contact with the roller 132 of the detector bell crank. There being no coins in the storage chutes to intercept their motion, the detector plungers will all slide leftwardly and thereby permit the bell crank 130 to be rocked clockwise (as viewed from the top) as a result of the force applied upon its roller 132 by the cam 129. The swing of the rocker arm 120 will continue and the bar 121 will thus move farther to the right (Fig. 11) until its abutment 128 is firmly accosted by the stationary latch plate 125 (Fig. 12). This action abruptly halts the movement of the latch bar 121 as well as the rocker arm 120, together with its associated cam shaft 24 and cams 25. The latter parts although rocked through a small angle have not been moved sufficiently to disengage the locking cams 25 from the recesses in the guide rods 22 of the delivery receptacles D.

In the event that an insufficient amount of coinage should be deposited in the mechanism under the same initial conditions as outlined above, a somewhat similar action to that already described will thereupon take place. Under such conditions, however, there is a possibility that one or more of the detector plungers will abuttingly engage coins within one or more of the storage chutes. If the amount of such deposited coinage is inadequate, however, the clockwise motion of the detector bell crank 130 will not be arrested due to the fact that the plunger linkage will fulcrum freely about the pivot point 134 and the pivot 146 or 148.

The plunger linkage is so arranged that the presence of an adequate amount of coinage in the coin storage chutes will produce sufficient opposition to the leftward movement of detector plungers on both sides of the pivot point 134 to substantially preclude fulcruming of the linkage about such point. In the latter event, an attempt to elevate one of the delivery receptacles D will initiate outward movement of the latch bar 121 so as to bring the cam 129 into engagement with the roller 132 of the bell crank (Fig. 11). After the bell crank has been rocked through a relatively slight angle in a clockwise direction, however, this motion is arrested due to the interception of the detector plungers by the deposited coins. Further elevating force upon the selected delivery receptacle D continues to swing the rocker arm 120 still further, causing the latter to drag the bar 121 until its cam 129 has climbed up on the roller 132. This lifts the trailing end of the latch bar 121 through a sufficient distance for its abutment 128 to clear the stationary latch plate 125. Sharp upward whipping of the bar 121 is prevented during this time by means of an adjustable mechanical stop 151 mounted on the plate 32 over the opening 124. Continued upward movement of the delivery receptacle D will now result in further rightward movement of the bar 121 (Fig. 14) against the force of a tensile return spring 152 disposed between the mounting plate 32 and the rocker arm 120. This action will continue until the bar 121 has reached its fully extended position illustrated in Fig. 15. At this point, the locking cams have been rocked to their fully disengaged position and the selected receptacle D can be elevated to its upper limit for delivery of the purchased item. Upon release of the elevated delivery receptacle after removal of the merchandise therefrom, the latter and its guide rod 22 will descend until the locking groove 26 therein registers with its associated locking cam 25. Due to the action of the return spring 152 on the rocker arm 120, the cam 25 will thereupon be urged into engagement once more with its associated locking groove 26. Once such engagement has taken place, further descent of the receptacle D and the guide rod 22 will assist the action of the spring and thus rotate the arm 120 clockwise (as viewed in Figs. 10 to 15), at the same time shifting the latch bar 121 leftwardly to its fully retracted position. For the purpose of restoring the bell crank 130 and the detector plunger linkage to its initial position, the bar 121 has fixed thereto a laterally projecting reset abutment 154 which is adapted to accost the roller 132 of the bell crank 130 and rock the latter to its extreme counterclockwise position.

In the exemplary mechanism 20, the detector plunger linkage is adapted to arrest the clockwise motion of the bell crank 130 under the following four operating conditions:

(1) When 4 pennies have been accumulated in the first or odd penny chute 45 and a dime deposited in the dime storage chute 108.

(2) When 4 pennies have been accumulated in the first penny storge chute 45 and two nickels in the nickel storage chutes 80 and 81.

(3) When 4 pennies have been accumulated in the first penny storage chute 45 together with 5 pennies in the second penny chute 46 and one nickel in the first nickel chute 80.

(4) When 14 pennies have been accumulated in the storage chutes of the penny accumulator 34C. This condition is illustrated in Fig. 6.

The individual coins in the combinations listed in the preceding paragraph can be deposited in any order, since the internal partitioning within the coin accumulators 34C, 35C and 36C automatically positions them relative to the various detector plungers.

*Coin dumping means*

In order to empty the coin accumulators 34C, 35C and 36C after a customer has taken steps to claim his purchase, provision is made for effecting a relative separation between the retainer plates 40, 69 and 102 and their respective backing plates 38, 66 and 100. This opens the coin storage chutes and, since the abutments on which the coins rest are all fashioned with bevelled upper edge surfaces, the deposited coins readily slide clear and descend to the cash box 31 via appropriate directing means. In the present instance, each of the retainer plates 40, 69 and 102 is supported upon a pair of vertically spaced upper and lower links 155, 156 (Figs. 4, 19 and 20) attached to the mounting plate 32 as by means of shoulder studs 158 and 159 for rocking movement in a generally vertical plane. Each of the lowermost links 156 is provided with a radially extending lug 156A adapted to coact with one of a plurality of abutments projecting laterally from a horizontally reciprocable dumping bar 160, such bar being adapted to couple the retainer plates for movement in unison. In the present instance the bar 160 is slidably supported as by means of a pair of brackets 157 (Figs. 4 and 19) fixed to the plate 32. Prior to the initiation of a cycle of operation, the retainer plates 40, 69 and 102 occupy positions close to their respective backing plates (Figs. 4 and 19), the dumping bar 160 at the same time lying in its righthand terminal position.

Means is provided for producing a leftward shift of the dumping bar 160 to empty the coin accumulators as an incident to the release of the mechanism 20 and elevation of a selected delivery receptacle D. This is accomplished in the exemplary mechanism by the use of a trigger 161 (Figs. 16, 17 and 19) pivotally carried by a fixed bracket 162 and adapted to be actuated by the latch bar 121 as the latter approaches its fully extended position. The trigger 161 is fashioned with a pair of diverging arms 161A, 161B, the former being arranged to project into the path of movement of a depending lug 164 unitary with the latch bar 121. The arm 161B terminates in a bifurcated end portion and in the present case is vertically offset from the arm 161A. In order to transmit motion from the trigger 161 to the dumping bar 160, the latter is equipped with an upstanding pin 165 of appropriate size to mesh with the bifurcations of the arm 161B. Referring once again to Figs. 16 and 17, it will be perceived that as the latch bar 121 is drawn toward its extended position, the depending lug 164 attached to its trailing end will accost the rounded end of the trigger arm 161A and thus rock the trigger clockwise until the arm 161A squarely abuts the mounting plate 32. This of course shifts the dumping bar 160 to the left (as viewed in Fig. 20), emptying the coin accumulators in the manner already described.

*Manual coin return and interlock*

As indicated earlier herein, coins desposited in the mechanism 20 and accepted by the latter are returnable at any time prior to release of the mechanism incident to claiming a purchase. This objective is achieved by means of a manual coin return linkage comprising the spring loaded plunger 38 accessible from the exterior of the machine, together with a pair of compression links 166, 168 and levers 169, 170 pivotally supported by the mounting plate 32. The lever 170 is pivoted upon the stud 159 and in this instance is located on the opposite side of the dumping bar 160 from the supporting link 156 associated with the retainer plate 102 (Figs. 4 and 19), being formed with a radially projecting portion 170A which is adapted to engage an abutment 171 on the dumping bar 160. The coin return linkage is so arranged that depression of the plunger 38 will cause a downward shift of the compression links 166 and 168 together with the lever 169 which connects them. Such downward movement will also rock the lever 170 counterclockwise through a small angle, shifting the dumping bar 160 to the left and emptying the coin accumulators in a manner identical with that obtaining under the action of the trigger 161. As a result of the actuation of the manual coin return, the coins dumped from the accumulators will be channelled into coin return box 30 by the coin directing means.

For the purpose of clearing the coin selectors 34B, 35B and 36B of spurious coins such as magnetic slugs, there is utilized a wiping arrangement which is actuated upon the depression of the manual coin return plunger 38. Such arrangement comprises an offset bar 172 (Figs. 3 and 4) in the form of an inverted U and carrying wipers 174, 175 and 176 respectively associated with each of the respective coin selectors. The bar 172 is connected to the lever 169 so that the downward swing of the latter will rotate the former through a sufficient angle to permit the wipers to dislodge any slugs from the coin selectors.

In order to preclude the return of the accumulated coins representing the purchase price after the customer has undertaken to claim his purchase, there is provided an interlocking means responsive to the position of the latch bar 121. Upon release of the latching bar and movement of the same toward its extended position, the interlock means is rendered effective to preclude movement of the dumping bar 160 with consequent separation of the retainer plates 40, 69 and 102 from the respective backing plates of the coin accumulators. As the bar 121 approaches its fully extended position, the interlock means is rendered ineffective and, as a consequence, does not interfere with the dumping of the accumulated coinage into the cash box 31 after the selected receptacle D has been released for elevation and delivery of the purchased article.

Referring once more to Figs. 9 to 17, it will be observed that the interlock means comprises a forked lever 177 pivoted as at 178 for vertical swinging movement upon the bracket 179 carried by the mounting plate 32. The lever 177 is biased preferably by means of a suitable spring (not shown) which tends to rock the former upwardly about its pivot point. The lower arm 177A of the lever 177 is adapted to register with a transverse slot 180 on the underside of the dumping bar 160. The upper arm 177B of the lever 177 is arranged to project into the path of a pair of longitudinally spaced cams 181 and 182 rigidly fixed to one side of the latching bar 121.

As long as the bar 121 remains in the latched condition indicated in Figs. 10 to 12, and the locking cams 25 preclude elevation of any of the delivery receptacles D, the arm 177A will be held clear of the slot 180 in the dumping bar due to the contact between the arm 177B and the cam 181. The lifting of the latch bar 121 incident to its release for movement toward its extended position results, however, in the gradual engagement of the arm 177A with the slot 180. As the bar 121 moves still further toward its extended position (Fig. 14), the cam 181 thereon slides clear of the upper arm 177B of the lever 177, permitting the latter to swing upwardly so as to bring the arm 177A all the way into the slot 180 of the dumping bar and thus lock the latter against all movement. As the bar 121 approaches its fully extended position, however, contact is made between the cam 182 and the arm 177B (Fig. 15) forcing the lever 177 downwardly and completely disengaging its arm 177A from the slot 180 in the dumping bar. This occurs just prior to contact between the lug 164 and the trigger 161, thereby freely permitting the latter to shift the bar 160 and dump the accumulated coins into the cashbox.

*Coin directing arrangement*

The mechanism 20 includes means for discriminating between coinage dumped from the coin accumulators as an incident to the release of a selected delivery receptacle and coinage dumped prior to any such release as a result of the depression of the manual coin return plunger 38. Coins dumped under the former condition must be channelled into the cash box 31, whereas those dumped under the latter condition must be channelled into the coin return box 30. In the present instance, this result is obtained by means of a chute assembly 184 (Fig. 4) secured to the mounting plate 32 in underlying relationship with the coin accumulators 34C, 35C and 36C. The assembly 184 is internally subdivided by a number of partitions defining therein a series of collecting chutes 185 together with an alternating series of return chutes 186. The collecting chutes 185 are, of course, adapted to direct coins into the cash box 31 while the return chutes 186 are arranged to direct coins into the return box 30. Interposed between the chute assembly 184 and the coin accumulators are a plurality of rockably mounted coin directing funnels 188 to 192, inclusive. These funnels are mounted so as to underlie the respective coin storage chutes in the accumulators and are normally maintained with their discharge ends in registration with respective ones of the return chutes 186. The funnels remain in such condition until the release of a delivery receptacle in the manner already described, whereupon they are moved into registration with the collecting chutes 185 for collection of the customer's purchase money.

Figure 7:
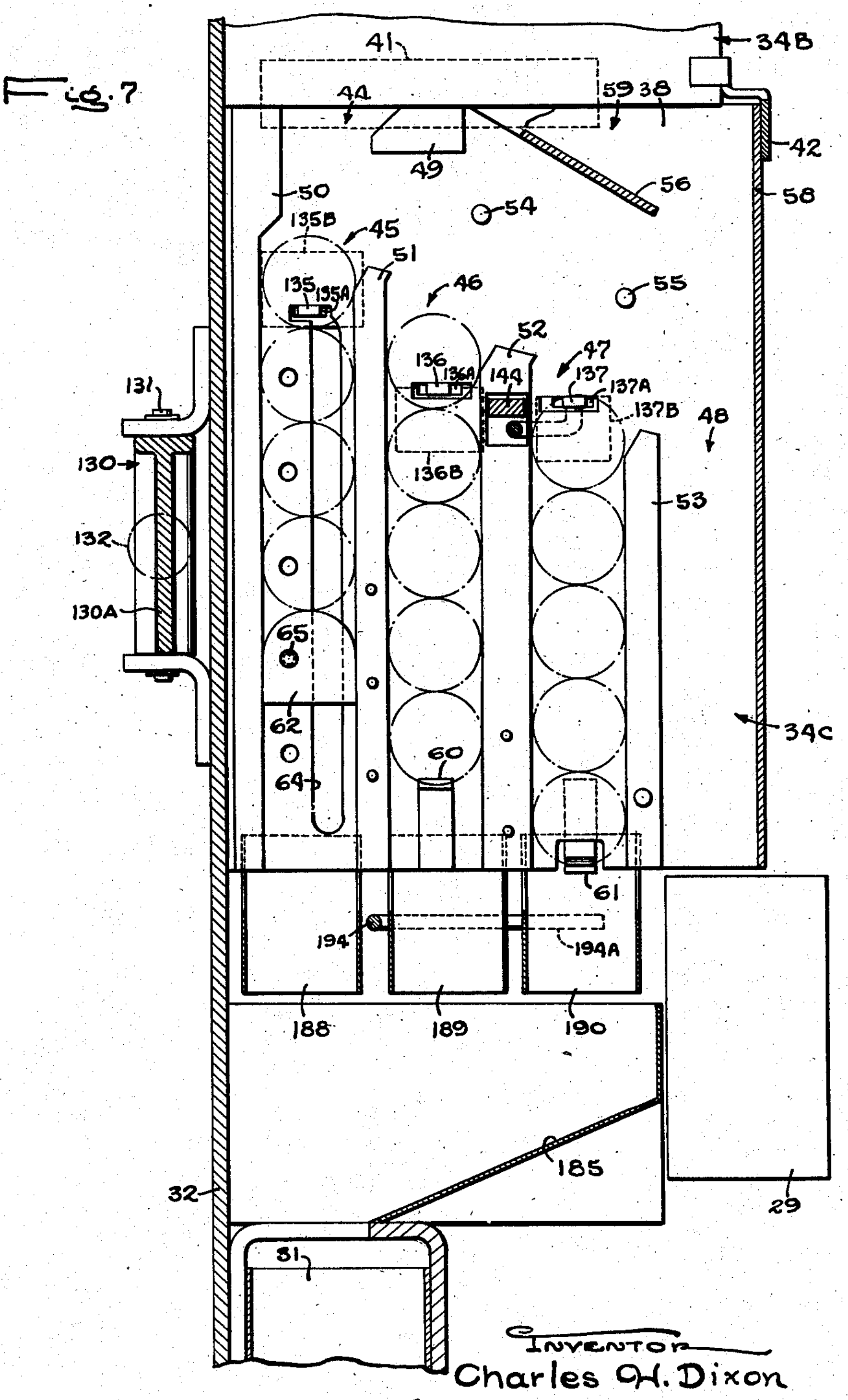
Fig. 7 is an enlarged fragmentary vertical sectional view taken longitudinally through the accumulator for coins of the lowest denomination and in the plane of the line 7—7 of Fig. 5.
Figure 8:
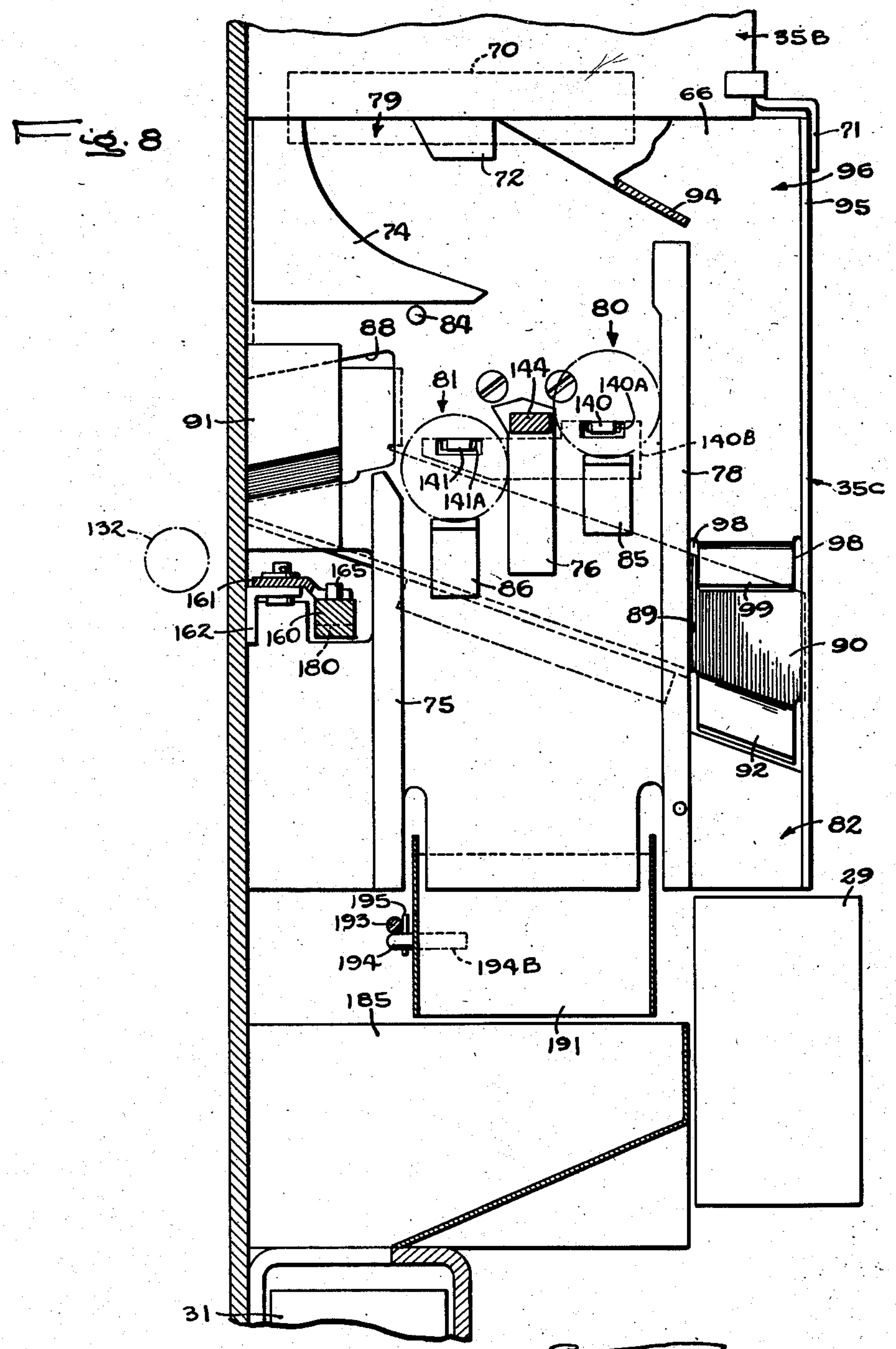
Fig. 8 is a view similar to that of Fig. 7 but taken through the accumulator for coins of the next highest denomination and in the plane of the line 8—8 in Fig. 5.

It has already been shown that excess coins deposited in any one accumulator after the filling of the coin storage chutes therein will be immediately and automatically channelled into the coin return box 30 via one or more of the accumulator return chutes 48, 82 and 109 (Figs. 7, 8 and 9). Such means alone, however, would not preclude the collection of excess coins which have entered one or more of the storage chutes in an unfilled coin accumulator. In order to prevent the collection of excess coins in the latter category and promptly return them to the customer, provision is made for selectively shifting certain ones of the coin directing funnels between coin collecting and returning positions in accordance with the various combinations of coins deposited within the accumulators.

Turning now to Figs. 7, 9, 21 and 23, it will be noted that the funnels 188 and 192 which respectively underlie the first or odd penny storage chute 45 and the dime storage chute 108 are constrained to swing in unison due to positive pivotal attachment to a rigid connecting link 193. On the other hand, the funnels 189, 190, 191, which respectively underlie the remaining two penny storage chutes 46, 47 and the two nickel storage chutes 80, 81, are journaled for independent rocking movement over the chute assembly 184. Such movement can only occur, however, when the funnels 188, 192 are in a collecting position due to the fact that the link 193 carries a U-shaped portion 194 rigidly fixed thereto as at 195. The ends of the portion 194 terminate in lateral extensions 194A, 194B which are adapted to respectively engage the funnels 189, 190 and 191 upon movement of the funnels 188, 192 clockwise relative to the former.

By reason of a linkage (Figs. 4, 9 and 10), connecting the funnel 192 with the rocker arm 120, the funnels 188 and 192 are shifted from coin returning to coin collecting position upon release of the latch bar 121 and disengagement of the locking cams 25. Such linkage includes a tension rod 196 housed within the dime accumulator 36C and having an upper offset portion extending through an opening 198 in the backing plate 100. The rod 196 connects the funnel 192 with a crank lever 199 pivoted to the backing plate 100 as at 200. The lever 199 is in turn connected to the rocker arm 120 by means of a second rod 201.

The funnels 189, 190 and 191, are normally maintained in a coin returning position, being selectively permitted to swing into a coin collecting position only under certain predetermined operating conditions. For this purpose, the above funnels are provided with projecting ears 189A, 190A and 191A (Figs. 21, 23) to which are pivoted a corresponding series of vertical drag links 202, 203 and 204.

Due to the weight of the projecting lugs and the drag links, biasing forces are set up tending to swing the funnels 189, 190, 191 into registration with the collecting chutes 185. Such registration is precluded, however, as a result of engagement between the dime detector plunger 144 and shoulders 202A, 203A and 204A (Fig. 22) formed in the respective drag links and overlying the plunger 144.

As explained earlier herein, the detector plunger linkage of the exemplary mechanism 20 is adapted to arrest the motion of the detector bell crank 130 and thereby release the latch bar 121 upon deposit of four different coin combinations, namely: (1) a dime and 4 pennies in the odd penny chute, the latter coins being referred to as the "odd pennies"; (2) two nickels and the odd pennies; (3) one nickel, 5 pennies and the odd pennies; (4) 14 pennies. By properly proportioning the relative lengths of the individual detector plungers (Fig. 5), an arrangement can be worked out whereby the dime detector plunger 144 can be made to occupy four different longitudinal positions corresponding respectively to the above coin combinations. Thus in response to the deposit of combination (1), the plunger 144 shifts from its initial position leftwardly through a small distance until it abuts the coin in the dime chute 108, the odd penny plunger 135 at the same time moving only a negligible distance into contact with the coin in the odd penny chute 45. Combination (2) permits plunger 144 to take a longer step to the left until the nickel plungers 140 and 141 and the odd penny plunger 135 contact the coins in their associated storage chutes 80, 81, 45, while combination (3) permits the plunger to move through an even longer leftward step, stopping upon the abutment of the plungers 140, 136 and 135 with the coins in storage chutes 80, 46, 45 with which they are respectively associated. The largest leftward step of all in the movement of the plunger 144 occurs, however, in response to the deposit of coin combination (4) when such movement is halted by contact between the penny detector plungers 135, 136 and 137 and the coins in the penny storage chutes 45, 46, 47 (Fig. 6).

The foregoing relationships are utilized to good advantage in regulating the individual swinging action of the funnels 189, 190, 191 from their returning to their collecting position. Accordingly, the dime detector plunger 144 is formed with a plurality of longitudinally staggered, lateral notches 205, 206 and 207 (Figs. 5, 21 and 23). Upon the deposit of certain ones of the four combinations set forth above, these notches will be selectively brought into registration with the shoulders of the drag links 202, 203 and 204, permitting the latter to descend and thus allowing the funnels 189, 190, 191 to swing from returning to collecting position under the action of their weight bias.

Assume now that a combination of coins having a total value in excess of the purchase price has been deposited within the coin accumulators. If such combination includes a dime, the dime detector plunger 144 will be shifted to its first leftward position (Fig. 23) upon the release of the mechanism 20. As the drawing indicates, none of the notches in the plunger 144 will register with the drag links 202, 203, 204 and the funnels 189, 190, 191, will consequently remain in a returning condition. Thus any nickels in the chutes 80, 81 and any pennies in the chutes 46, 47 will automatically be returned to the customer via the funnels 189, 190, 191 when the latter claims his purchase. These funnels remain in their coin returning position even after the dime is released since by that time the latch bar cam 129 has ridden over the detector bell crank roller 132 and there is no longer any force on the plunger 144 tending to shift the same further to the left.

Assume further that the coin combination which exceeds the purchase price does not include a dime but does comprise nickels and pennies. Under such circumstances, when the mechanism 20 is released the dime detector plunger 144 will be shifted to its second leftward position. This will permit the drag link 204 of the nickel directing funnel 191 to descend and thereby allow that funnel to swing into its collecting position. The odd penny directing funnel 188 will also be rocked into collecting position, but the other penny directing funnels 189, 190 will be held in returning position by their drag links 202, 203. When the customer elevates a delivery receptacle to claim his purchase, therefore, coin combination (2) is collected and the excess pennies are automatically returned via the chutes 189, 190.

If an excess deposit includes but one nickel, the remainder being pennies, the plunger 144 will stop in its third leftward position. In this position, the drag link 204 of the nickel funnel 191, as well as the drag link 202 of the funnel 189 will register respectively with the slots 207, 205, allowing the funnels 191 and 189 to move into their collecting positions along with the odd penny funnel 188. Funnel 190 will be held in its returning position by its drag link 203. Thus the nickel, the five pennies from the storage chute 46, and the pennies from the odd penny chute 45 will be collected upon release of the mechanism, while the excess pennies in the chute 47 will be returned to the purchaser.

If all the deposited coins are pennies, there can be no excess retained in the accumulators because any extra pennies will immediately spill into the return chute 48 in the manner already described. Under these circumstances, the plunger 144 will be shifted into its fourth position, allowing the drag links 202, 203, to descend and thus permitting the penny funnels 189, 190 to move into coin collecting position along with the odd penny funnel 188.

When the selected receptacle D descends after the delivery of the purchased article, its guide rod 22 engages the associated locking cam 25 and commences to reset the mechanism for the next operating cycle. During this process, the link 196 shifts downwardly, positively swinging the directing funnels 188, 192 to their coin returning position. The lateral abutments 194A, 194B, unitary with the connecting link 193, thereupon accost any of the other directing funnels 189, 190, 191, which happen to be in the coin collecting position, rocking such funnels back into the coin returning position. As a matter of incidental interest, it might be noted here that the abutments 194A, 194B, also prevent the funnels 189, 190, 191 from swinging into collecting position due to leftward shifting of the dime detector plunger when an attempt is made to operate the mechanism without depositing sufficient coinage.

*Résumé of operation*

While the operation of the mechanism 20 is undoubtedly already clear to those skilled in the art, a brief summary might be appropriate at this point. Using the exemplary total value of fourteen cents, the operation of the device will be traced after deposit of the first of the four coin combinations to which it is responsive, namely, one dime and four pennies (the odd pennies).

Figure 1:
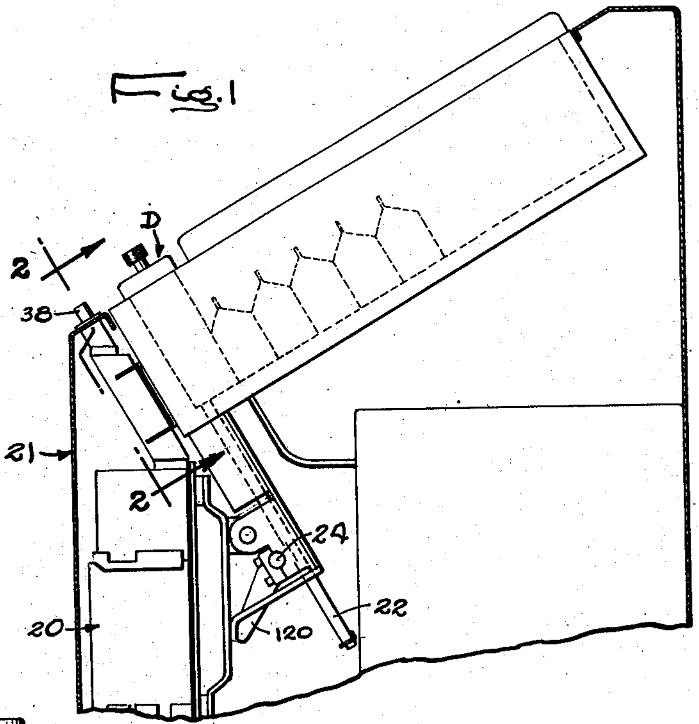
Figure 1 is a fragmentary vertical sectional view through the cabinet of a vending machine in which a coin controlled lock mechanism embodying the invention has been utilized, such mechanism being shown in side elevation.
Figure 2:
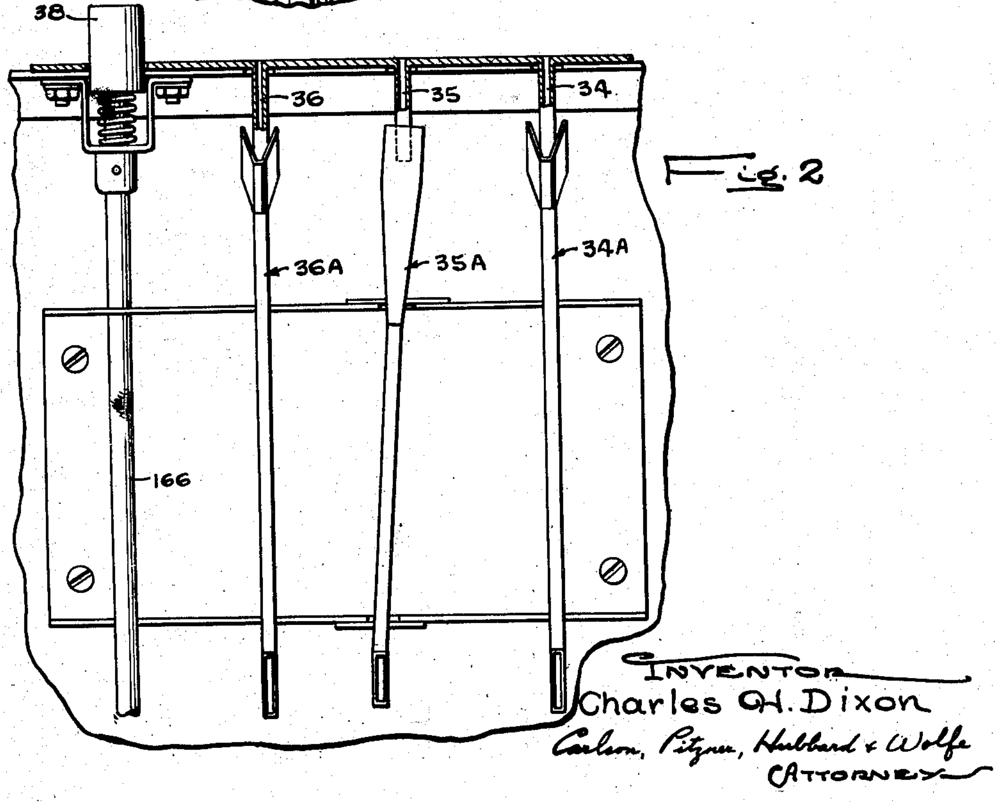
Fig. 2 is an enlarged fragmentary sectional view taken along the line 2—2 of Fig. 1 and showing details of the coin slots together with the coin entry chutes.
Figure 3:
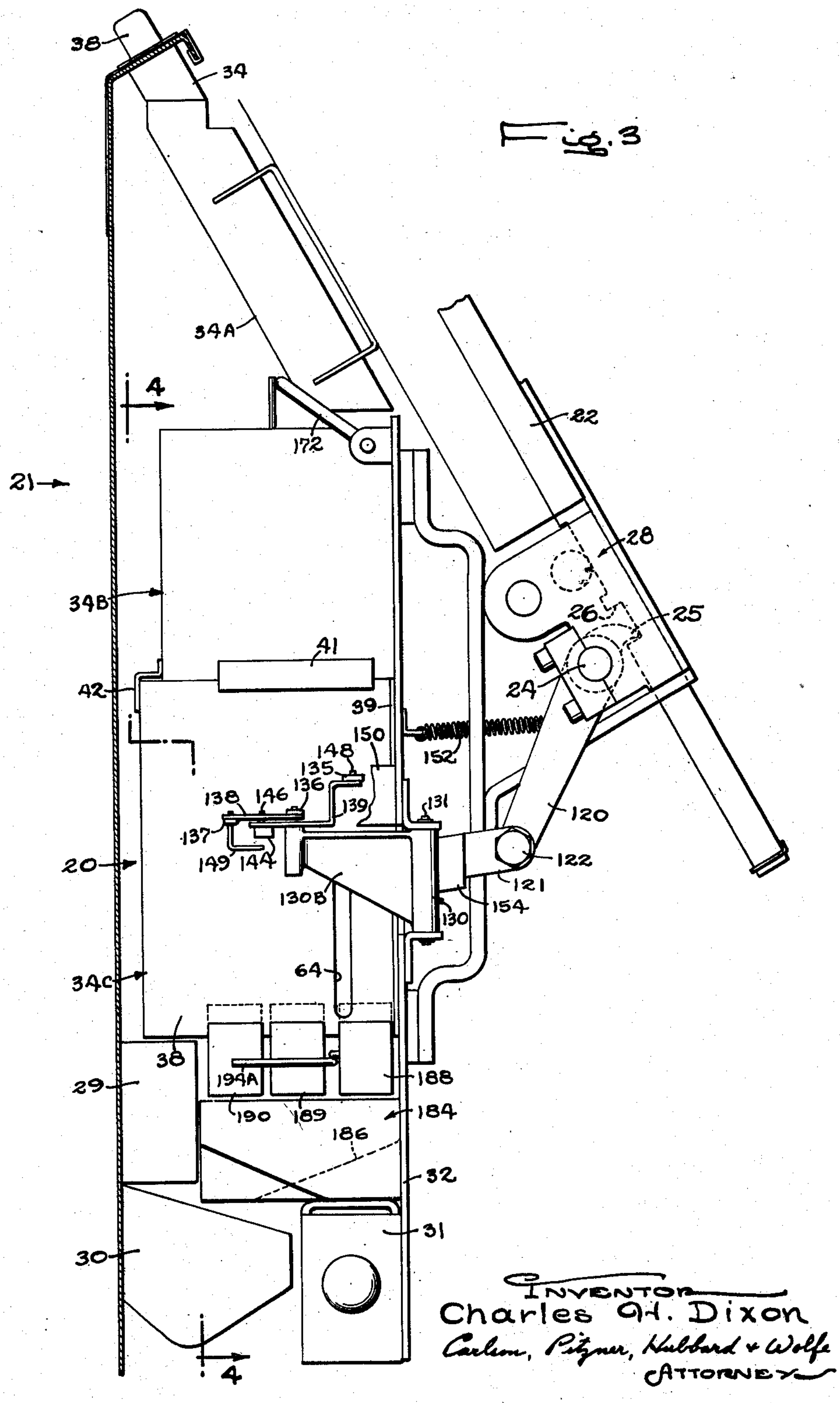
Fig. 3 is an enlarged fragmentary vertical sectional view through the cabinet of the machine illustrated in Fig. 1 and showing a side elevation of the complete lock mechanism in considerable detail.

Assuming the mechanism to be in the locked condition indicated in Figs. 1, 3, and 10, the deposited coins will travel from the coin slots 34, 36 to the coin accumulators 34C, 36C via the respective entry chutes and the corresponding coin selectors. The dime will enter the dime accumulator 36C (Fig. 9) through the passage 106, dropping into the storage chute 108 where its descent will be arrested by the abutment 115. The odd pennies, on the other hand, will enter the penny accumulator 34C (Fig. 7) through the passage 44, dropping into the storage chute 45 and filling the same.

Figure 13:
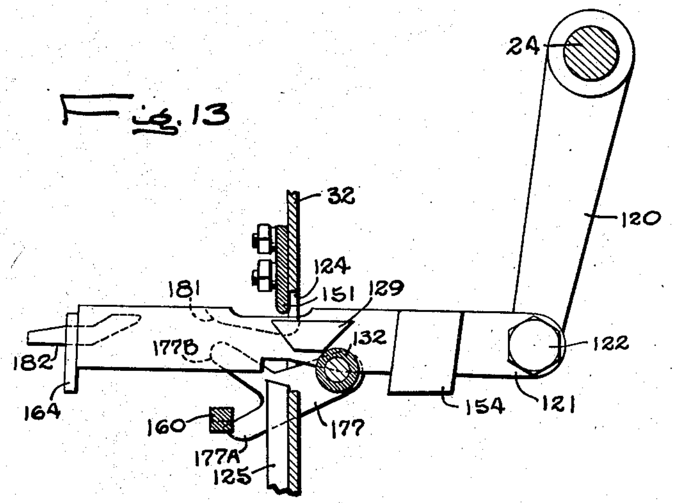
Figs. 13, 14 and 15 are fragmentary views of the linkage of Fig. 10 illustrating sequentially the manner in which the latch bar is released after proper coinage has been deposited.

Having deposited coinage of appropriate value the customer is then in a position to claim his purchase. In the present instance, this is done by manually elevating a selected one of the delivery receptacles D, such action also elevating the guide rod 22 of the selected receptacle. Due to the engagement between the notch 26 of the guide rod and its associated locking cam 25 (Fig. 3), the cam shaft 24 and rocker arm 120 are rotated in a direction tending to shift the latch bar 121 toward its extended position. The cam 129 on the latch bar will thereupon contact the roller 132 of the detector bell crank 130 and, since coinage having a total value equal to the purchase price has been accumulated, the detector plunger linkage will arrest the motion of the bell crank 130 and permit the cam 129 to ride up on the roller 132 (Fig. 13). This is of course due to the interception of the movement of the dime and odd penny detector plungers 144, 135, by the coins in the chutes 108, 45. By reason of the foregoing, the latch bar is rendered free to move into its fully extended position, temporarily locking out the manual coin return by means of the lever 177 and finally dumping the coin accumulators by means of the trigger 161 and the dumping bar 160 (Figs. 16, 17 and 20). The dumped coinage will then be directed from the chutes 108 and 45 to the cash box 31 via the coin directing funnels 192, 188, which have been automatically brought into registration with the collecting chutes 185. Since the dime detector plunger 144 will be in its first leftward position under these conditions, the funnels 189, 190, 191 (Figs. 21, 22, 23) will be maintained in a returning position so as to refund to the customer any excess coins in the penny and nickel accumulators. Any excess dimes will have been automatically returned prior to this time by spilling over into the return chute 109 of the dime accumulator.

The mechanism 20 behaves in a generally similar manner upon the deposit of the other three responsive coin combinations. The principal differences in operation, under the latter circumstances, reside in the behavior of the detector plunger linkage and the coin directing means. Since these matters have already been covered in considerable detail in the specification, further comment would seem to be unnecessary.

As pointed out earlier herein, the mechanism may be readily conditioned for response to various predetermined values of coinage by altering the capacity of the odd penny storage chute through the use of the adjustable abutment 62 (Fig. 7). The capacity of the other storage chutes of the coin accumulators could also be varied in a similar manner to accommodate the mechanism to still other coin combinations.

I claim as my invention:

1. A multiple coin controlled lock mechanism adapted to permit the release of article dispensing means in vending machines and the like upon the deposit of coinage aggregating a predetermined total value, said mechanism comprising the combination of coin selectors adapted to receive deposited coinage and to reject spurious coins, coin accumulators for releasably retaining deposited coins received from said coin selectors, dumping means for discharging the coins from said coin accumulators, a coin detecting and counting system having a normally yieldable abutment susceptible of becoming non-yieldable in response to the depositing within said accumulators of any combination of coins from the denominational series included within the predetermined total value and aggregating such total value, and a latch bar susceptible of release upon contact with said abutment in its non-yieldable condition, said latch bar being adapted to actuate said dumping means and to release the article dispensing means when coinage having a predetermined total value has been deposited.

2. In a multiple coin controlled lock mechanism for controlling the article dispensing means of vending machines and the like, the combination comprising coin accumulators for releasably retaining deposited coins aggregating a predetermined total value, dumping means for discharging the deposited coins from said coin accumulators, a coin detecting and counting system operatively associated with said coin accumulators, said system including a normally yieldable abutment adapted to become non-yieldable upon deposit of coinage having the predetermined total value, and an extensible latch member releasable in response to contact with said abutment in its non-yieldable condition for actuating said dumping means and releasing the article dispensing means upon the deposit of any combination of coins from the denominational series included within the predetermined total value and aggregating such total value, and coin directing means for channeling the released coins into a cash box.

3. In a multiple coin controlled mechanism for releasing the article dispensing means of a vending machine upon the deposit of coinage equal to the purchase price of an article of merchandise, the combination comprising coin accumulators for receiving and temporarily retaining deposited coins, a dumping mechanism adapted when actuated to open said accumulators and to discharge coins therefrom, coin directing means adapted to channel coins from said accumulating means into a coin return box accessible from the exterior of said machine, a manual coin return linkage including a plunger operable from outside the machine and arranged to actuate said dumping mechanism, means including a shiftable latch bar for releasing the article dispensing means upon the deposit of coinage aggregating a predetermined total value, and an interlock operatively associated with said releasing means and said dumping mechanism, said interlock being adapted to preclude actuation of the latter by said manual coin return linkage upon release of the article dispensing means, and cam means for rendering said interlock ineffective as said shiftable latch bar and said article dispensing means reach their fully released position.

4. In a multiple coin controlled mechanism of the character set forth for releasing the article dispensing means of a vending machine, the combination of coin accumulators for receiving and temporarily retaining deposited coins, an extensible latch bar for releasing the article dispensing means upon deposit of coinage in the accumulators aggregating a predetermined total value, a dumping bar adapted when shifted longitudinally to open said accumulators and to discharge coins therefrom, said dumping bar having a transverse slot intermediate its ends, coin directing means adapted to channel coins aggregating said total value from said accumulating means into a coin return box or a cash box depending upon the position of said extensible latch bar, a manual coin return linkage arranged to shift said dumping bar longitudinally, a pivotally mounted interlock adapted to engage the slot in said dumping bar to preclude longitudinal movement of the same, cam means carried by said latch bar for urging said interlock into engagement with the slot in said dumping bar at the start of the releasing movement of said latch bar, and cam means also carried by said latch bar for disengaging said interlock from the slot as the latch bar approaches the end of its releasing movement.

5. A multiple coin controlled lock mechanism adapted to permit the release of article dispensing means in vending machines and the like, comprising, in combination, coin accumulators including coin storage chutes for assembling various combinations of deposited coins, a coin detector plunger linkage adapted to assume various positions relative to said accumulators depending upon the particular coin combinations present in the storage chutes, a coin dumping mechanism for opening said accumulators and discharging coins therefrom, and a plurality of coin directing funnels normally disposed to channel such discharged coins into a coin return box, said funnels being selectively shiftable in response to the position of said detector plunger linkage to channel said discharged coins into a cash box.

6. A multiple coin controlled lock mechanism for vending machines and the like, comprising, in combination, a plurality of coin accumulators each having one or more coin storage chutes for assembling various combinations of deposited coins, a plurality of detector plungers pivotally connected into a linkage disposed transversely of said accumulators and adapted to assume various positions relative to the latter depending upon the particular coin combinations present in the storage chutes, one of said plungers being arranged to span all of said coin accumulators and having lateral slots spaced longitudinally therealong, a coin dumping mechanism for opening said accumulators and discharging coins therefrom, and a plurality of coin directing funnels each adapted to rock between a coin collecting position and a coin returning position, upstanding drag links pivotally connected to certain of said funnels and having shoulder portions overlying said one detector plunger having the lateral slots, said funnels being selectively shiftable from coin returning to coin collecting position upon registration of the shoulder portions of said drag links with the lateral slots of said one detector plunger.

7. A lock mechanism for controlling the release of the article dispensing means of vending machines and the like upon the deposit of coinage aggregating a predetermined total value, said mechanism comprising the combination of coin accumulators including coin storage chutes for assembling various combinations of deposited coins, an extensible latch bar normally arranged to preclude the release of said article dispensing means, a detector plunger linkage shiftable into various positions relative to said accumulators depending upon the particular coin combinations present in the storage chutes, a detector bell crank pivotally connected to said plunger linkage and adapted to assume angular positions corresponding to the positions of said linkage, and a cam unitary with said latch bar and adapted to ride over one of the arms of said bell crank when the latter occupies certain positions corresponding to coin combinations aggregating said predetermined total value, said latch bar being adapted to permit the release of said article dispensing means when said cam rides over the arm of said bell crank.

8. A lock mechanism for controlling the release of the article dispensing means of vending machines and the like upon the deposit of coinage aggregating a predetermined total value, said mechanism comprising the combination of coin accumulators including coin storage chutes for assembling various combinations of deposited coins, a normally engaged latch bar arranged to preclude the release of the article dispensing means, a detector plunger linkage shiftable into various positions relative to said accumulators depending upon the particular coin combinations present in the storage chutes, a rockably mounted detector bell crank having one arm pivotally connected to said plunger linkage, said bell crank being adapted to assume various angular positions corresponding to the positions of said plunger linkage, a cam unitary with said latch bar, a roller carried by the other arm of said bell crank and arranged to accost said cam, said roller being adapted to disengage said latch bar upon contact with said cam when said bell crank occupies certain positions corresponding to coin combinations aggregating said predetermined total value, said latch bar being adapted upon disengagement to permit the release of the article dispensing means.

9. A lock mechanism for controlling the release of manually operable article dispensing means of vending machines and the like comprising, in combination, coin accumulators for assembling various combinations of deposited coins, a stationary latch plate, an extensible latch bar normally engaged by said latch plate so as to preclude the release of said article dispensing means to an airticle delivery position, a detector plunger linkage shiftable into various positions relative to said accumulators depending upon the particular coin combinations present therein, a rockably mounted detector bell crank pivotally connected to said plunger linkage and positionable in response to the shifting of the latter, a cam unitary with said latch bar and disposed for engagement with said bell crank, said cam being adapted to disengage said latch bar upon contact with said bell crank when the latter occupies certain positions, and a reset abutment unitary with said latch bar and arranged to contact said bell crank upon the return of said article dispensing means from article delivery position, such contact serving to reset said bell crank and detector plunger linkage.

10. In a lock mechanism for permitting the release of the article delivery means of a vending machine in response to the deposit of various combinations of coins aggregating a predetermined total value, the combination comprising a plurality of coin accumulators each having one or more coin storage chutes and a return chute for channeling excess coins into a coin return box upon the filling of said storage chutes, a coin detecting linkage shiftable into various positions relative to said accumulators, such positions corresponding to the coin combination in the storage chutes, dumping mechanism for opening said coin accumulators and discharging coins therefrom, a plurality of coin directing funnels swingable between coin collecting and coin returning positions and adapted to receive the discharged coins from the storage chutes of said coin accumulators, and drag link connecting means between certain of said funnels and said coin detecting linkage, said connecting means being adapted to orient said funnels so as to collect coinage aggregating the predetermined value and to return any coinage in excess of said value.

11. In a coin controlled mechanism of the character set forth and having an extensible latch bar associated with the manually operable article delivery means of a vending machine, the combination comprising a plurality of coin accumulators arranged to receive and assemble deposited coins, said accumulators having relatively separable plates for retaining coins therein, a longitudinally shiftable dumping bar adapted to move certain ones of said separable plates and thus discharge coins from said accumulators, a rockable trigger arranged to shift said dumping bar to effect discharge of said accumulators, a depending lug unitary with said extensible latch bar, said lug being adapted to rock said trigger and thus shift said dumping bar as said extensible bar approaches a fully extended position.

12. In a coin controlled lock mechanism of the character set forth wherein a manually operable article delivery receptacle is rendered releasable due to the unlatching of an extensible bar, the combination of coin accumulators having storage chutes for receiving deposited coins, said accumulators being formed with holes in the walls of the storage chutes, a rockably mounted detector bell crank having one arm disposed for engagement by said extensible bar, a detector plunger linkage shiftable transversely of said accumulators and having individual plungers adapted to enter said storage chutes through the holes in the walls thereof, and a cross lever pivotally connecting said plunger linkage to the other arm of said bell crank.

13. In a coin controlled lock mechanism of the character set forth wherein a manually operable article delivery receptable is rendered releasable due to the unlatching of an extensible member by a rockably mounted bell crank, the combination of coin accumulators having storage chutes for receiving deposited coins, said accumulators being formed with holes in the walls of the storage chutes, a plurality of detector plungers each associated with a respective one of the coin storage chutes and adapted to be moved transversely thereof through the holes in the walls, a plurality of cross levers pivotally connecting the ends of certain of said plungers together, one of said cross levers being pivotally connected intermediate its ends to said bell crank and adapted to fulcrum on such pivotal connection in response to the presence of certain coin combinations in said storage chutes.

CHARLES H. DIXON.

REFERENCES CITED

The following references are of record in the file of this patent:

UNITED STATES PATENTS

| Number | Name | Date |
|---|---|---|
| 1,699,353 | Grant | Jan. 15, 1929 |
| 2,040,983 | Du Grenier | May 19, 1936 |
| 2,247,888 | Neidig | July 1, 1941 |
| 2,279,664 | Du Grenier | Apr. 14, 1942 |
| 2,320,378 | Neidig | June 1, 1943 |

FOREIGN PATENTS

| Number | Country | Date |
|---|---|---|
| 334,770 | Germany | Mar. 19, 1921 |